United States Patent [19]
Smith, Jr. et al.

[11] 3,780,301
[45] Dec. 18, 1973

[54] PULSED NEUTRON LOGGING SYSTEMS FOR DETECTING GAS ZONES

[75] Inventors: Harry D. Smith, Jr.; Dan M. Arnold; Ward E. Schultz, all of Bellaire, Tex.

[73] Assignee: Texaco Inc., Houston, Tex.

[22] Filed: Sept. 20, 1971

[21] Appl. No.: 182,036

[52] U.S. Cl. .................. 250/83.3 R, 250/83.6 W
[51] Int. Cl. ............................................. G01t 1/16
[58] Field of Search ............... 250/83.6 W, 83.6 S, 250/83.3 R, 71.5 R

[56] References Cited
UNITED STATES PATENTS
3,483,376  12/1969  Locke et al. ................. 250/83.6 W Primary Examiner—Walter Stolwein
Assistant Examiner—Davis L. Willis Attorney—Thomas H. Whaley et al.

[57] ABSTRACT

An illustrative embodiment of the invention estimated methods and apparatus for producing inelastic neutron scattering logs of earth formations surrounding a well borehole. The gamma rays emitted by nuclei of at least carbon, oxygen, silicon and calcium which are excited by inelastically scattered fast neutrons are observed by energy separation and are individually logged as a function of borehole depth. The silicon/calcium and carbon/oxygen inelastic gamma ray counts ratios are also logged as a function of borehole depth. Low hydrogen content of the formations may be stimated by detecting a high count rate in each of the four energy windows and then by comparing the Si/Ca and C/O ratios in these regions to the Si/Ca and C/O ratios for a known water sand, the relative abundance of limestone in the low hydrogen content formations may be estimated thus distinguishing gas zones from water saturated low porosity limestone.

12 Claims, 4 Drawing Figures

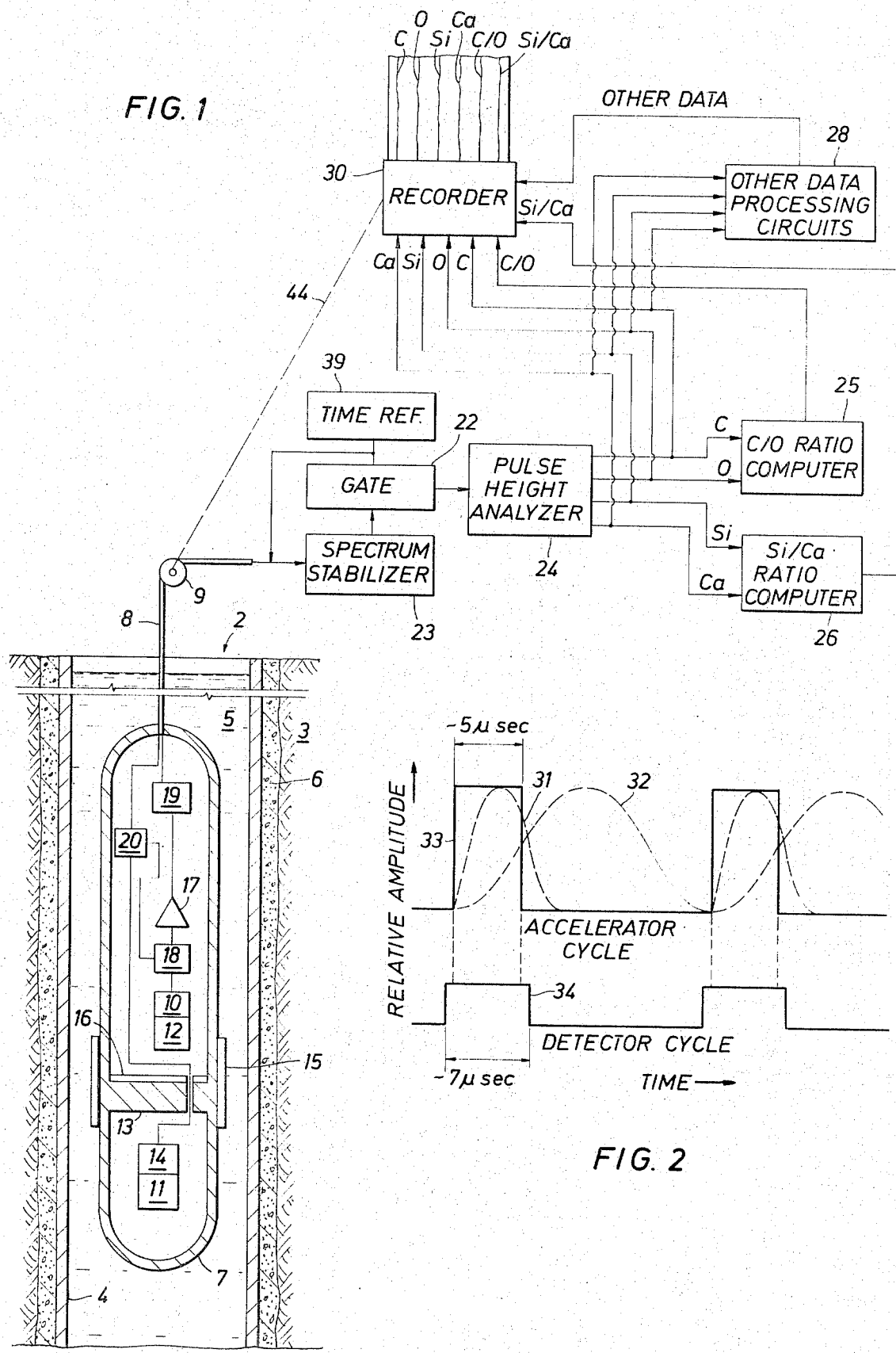

PULSED NEUTRON LOGGING SYSTEMS FOR DETECTING GAS ZONES

BACKGROUND OF THE INVENTION

This invention relates to radiological well logging methods and apparatus for investigating the characteristics of subsurface earth formations traversed by a borehole and, more particularly, relates to improved neutron gamma ray logging methods and apparatus.

It is well known that oil and gas are more likely to be found in commercially recoverable quantities from those earth formations which are relatively porous and permeable than in more highly consolidated earth formations. It is also well known that oil or gas producing formations may be located by passing a neutron source through the borehole and measuring the intensity of secondary gamma ray radiation developing from the neutron irradiation, as a function of borehole depth.

In particular the chlorine nucleus which has a very high thermal neutron capture cross section (more so than that of the nuclei of other rather commonly found elements) is a good indicator of the location of salt water. Thus salt water filled limestone or sandstone layers will have a greater macroscopic thermal neutron capture cross section than an oil saturated layer. When combined with other porosity information, oil can thus be detected. This neutron capture cross section difference has been observed in the past by measuring either chlorine capture gamma rays or the liftime or decay constant of the thermal neutron population in the layer in question.

The above-mentioned salt water detection techniques have proven to be very useful in the past in locating oil and gas bearing earth formations. However, many spurious indications have been produced by this logging technique due to the fact that it depends on the presence of a rather large amount of sodium chloride in the formation fluid. There has been no commercially available well logging method which could distinguish oil from water in earth formations when the water salinity is low. For example, the above-mentioned chlorine or neutron lifetime logs require water salinities in excess of about 30,000 parts per million sodium chloride before the oil located in the pores of the formation can be differentiated reliably from salt water.

Accordingly, it has been proposed in the prior art to make a measurement of at least a portion of the gamma ray energy spectrum due to inelastic neutron scattering events from neutron irradiated earth formations. This has been proposed because carbon and oxygen have significant inelastic cross sections while having relatively small capture cross sections. Thus the carbon and oxygen nuclei in the earth formations surrounding the borehole will engage in appreciable inelastic scattering interactions with the bombarding neutrons. Gamma rays resulting from the inelastic neutron scattering interactions will be referred to henceforth as inelastic gamma rays. However, this approach has been limited in the past to some extent because the inelastic scattering cross section for carbon and oxygen only become appreciable if relatively high energy neutrons are available to provide the interaction. It has heretofore been difficult to provide sufficient quantities of energetic neutrons to reliably perform this type of log. The development of improved pulsed neutron generators has made possible the measurement of the inelastic scattering gamma ray energy spectrum from relatively high energy neutron irradiated earth formations. Attempts have been made to measure the carbon and oxygen inelastic scattering interactions with 14 MEV neutrons generated in pulsed neutron generators of the deuterium-tritium type.

To the present, however, none of the proposed logging methods utilizing this concept have proven reliable. One of the main reasons for lack of success in these attempts has been the prevelance of carbon in significant amounts in the earth's crust. Limestone formations are largely composed of calcium carbonate and thus a water bearing limestone formation can possibly produce more carbon gamma rays due to inelastic scattering than an oil filled sand or shale. By making measurements of the number of gamma rays produced due to inelastic scattering of neutrons by carbon, oxygen, silicon, and calcium nuclei and appropriately combining these measurements into carbon/oxygen and silicon/calcium ratios, it has been possible to resolve heretofore ambigious results. This technique also makes it possible to detect and differentiate gas zones from low porosity carbonate zones.

A problem which arises, even if the improved pulsed neutron sources presently available are used to perform inelastic neutron scattering logs, is the loss in resolution caused by pulse pileup. Pulse pileup results from the fact that a logging system including the electronic circuits and well logging cable thereof has the capability to effectively count at only a finite instantaneous counting rate. In this regard the neutron source to gamma ray detector spacing becomes particularly critical in regulating count rate so as to not exceed the finite instantaneous count rate limitation of the system. Thus, in order to enhance the statistical accuracy of the measurements (which generally is a function of the total number of counts) the source to detector spacing and pulse repetition rate of the pulsed neutron source may be varied to obtain the optimum results; the duration of each individual neutron pulse is also made as short as possible (approximately 5 microseconds). It is possible to obtain a source to detector spacing and pulse repetition rate which will provide a maximum number of total counts while not exceeding the instantaneous count rate limitation of the system. Keeping the pulse duration as short as possible for inelastic neutron logging reduces the eroneous counts due to thermal neutron capture events. This results, as will be discussed subsequently, because there is not a sufficient duration for such a thermal neutron background to build up during the pulse. However, increasing the pulse repetition rate too much can lead to the existence, during the counting interval for inelastic gamma rays, of a large thermal neutron population from a previous neutron pulse. This problem may be dealt with, however, as outlined in copending patent application Ser. No. 182,037 filed Sept. 20, 1971.

It will be appreciated by those skilled in the art that the foregoing discussion of parameters which may be varied to optimize the logging speed and counting statistics are interdependent, not only with each other, but also with physical parameters of the well bore being examined. For example, the well bore diameter, relative thickness of casing and cement sheath and type of borehole fluid can all affect the inelastic gamma ray counting rates. Thus in order to obtain reasonable counting rates at reasonable source-to-detector spacings and still maintain resolvable gamma ray pulses which are not seriously deteriorated by the pulse pileup phenomena, it is desirable to repeat the neutron pulses at as high a repetition rate as is practicable.

Accordingly, it is an object of the present invention to provide an improved method and apparatus of well logging for indicating the presence of gas sands in the vicinity of low porosity lime (carbonate) zones.

A further object of the invention is to provide new and improved methods and apparatus for determining the location of gas zones by using measurements of the inelastic scattering due to carbon, oxygen, silicon, and calcium in earth formations surrounding a well borehole.

A still further object of the invention is to provide a well logging system which indicates directly the presence of gas sands in earth formations surrounding a well borehole independently of the presence of chlorine in these formations.

The above and other objects, features, and advantages of the present invention are provided in a pulsed neutron well logging system. Time dependent gate means isolate the inelastic gamma rays eminating from the earth formations surrounding the well borehole. Four energy intervals or "windows" in the inelastic gamma ray energy spectrum are positioned and their width chosen so that inelastic gamma rays from carbon, oxygen, silicon, and calcium are detected. The counting rate in each of these windows is inversely related to the presence of hydrogen. Therefore, an observation in a given zone of counting rates in all windows exceeding certain predetermined levels is indicative of a relatively low formation hydrogen index. By then comparing the inelastic carbon/oxygen and silicon/calcium values for this zone in an appropriate manner the formation lithology may be differentiated as either predominantly silaceous or predominately carbonaceous. An estimate of the presence of hydrocarbon gas in the formation may then be obtained.

The above and other objects, features, advantages of the invention are pointed out with particularity in the appended claims. The present invention is best understood by taking the following detailed description in conjuction with the appended drawings in which:

BRIEF DESCRIPTION OF THE DRAWINGS

FIG. 1 is an overall schematic block diagram of a well logging system in accordance with the invention.

FIG. 2 is a timing diagram showing the relationship of accelerator and detector on-time with respect to gamma rays caused by the inelastic scattering of neutrons and thermal neutrons in the vicinity of the borehole.

DESCRIPTION OF THE PREFERRED EMBODIMENT

Figure 3:
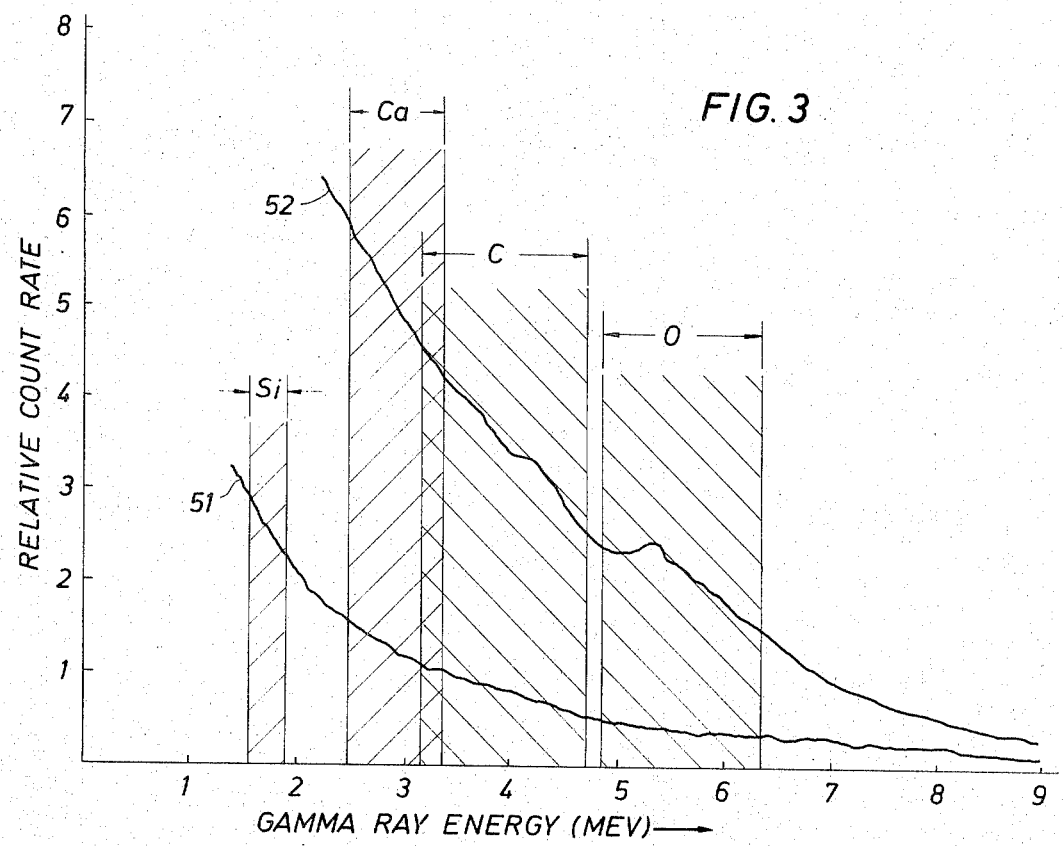
FIG. 3 shows a graphical representation of a gamma ray spectrum resulting from the inelastic scattering of neutrons and showing the relative locating of the silicon, calcium, carbon and oxygen inelastic gamma ray energy windows.

Referring initially to FIG. 1 there may be seen a simplified functional representation in the form of a block diagram of well logging apparatus in accordance with the invention. A borehole 2 penetrating earth formation 3 is lined with a steel casing 4 and filled with a well fluid 5. The steel casing 4 is cemented in place by a cement layer 6 which also serves to prevent fluid communication between adjacent producing formations in the earth 3.

The downhole portion of the logging system may be seen to be basically composed of an elongated fluid tight hollow body member or sonde 7 which, during the logging operation, is passed longitudinally through the casing 4 and is sized for passage therethrough. Surface instrumentation, whose function will be discussed in more detail subsequently, is shown for processing and recording electrical measurements provided by the sonde 7. A well logging cable 8 which passes over a sheave wheel 9 supports the sonde 7 in the borehole and also provides a communication path for electrical signals to and from the surface equipment and the sonde 7. The cable 8 may be of a conventional armoured well logging type and may have one or more electrical connectors for transmitting such signals between the sonde 7 and the surface apparatus.

Again referring to FIG. 1, the sonde 7 contains a source of high energy neutrons 11. The neutron source contemplated for use herein is a pulsed neutron source operating from the principle of the deuterium-tritium reaction. However, it will be understood by those skilled in the art that other types of pulsed neutron sources may be used if desired. A suitable radiation detector comprising a photomultiplier tube 10 and a detector crystal 12 is provided in the sonde 7 for detecting gamma ray radiation resulting from the inelastic scattering of high energy neutrons by the earth formations 3 surrounding the well borehole 2. A radiation shield 13 of iron, lead or other suitable material is interposed between the neutron accelerator 11 and the crystal detector 12 of the apparatus. The detector crystal 12 may comprise a thallium doped sodium iodide, cesium iodide, or other like activated material which is optically coupled to the photomultiplier 10. Additionally, a thermal neutron shielding sleeve 15 may be provided as shown about the detector crystal 12 on either the interior or exterior well portion of the sonde. A thermal neutron shielding disc 16 is interposed between the radiation shielding material 13 and the detector crystal 12 to reduce the probability of thermal neutrons reaching the crystal.

The radiation shielding 13 reduces the probability of direct irradiation of the detector crystal by neutrons emitted from the pulsed neutron source accelerator 11. The thermal neutron shielding disc 16 and cylinder 15 surrounding the detector crystal may be comprised of boron or any other suitable material having a high thermal neutron capture cross section. This shield serves to further reduce the possibility of thermal neutrons which follow a tortuous path and have been slowed by the borehole fluid 5 or the shielding material 13 from reaching the vicinity of the detector crystal and possibly causing neutron activation of the iodine or other elements comprising the crystal. Moreover, the thermal neutron shield reduces the probability of neutrons from a previous accelerator pulse interacting with materials in the sonde itself or the crystal itself thus causing the emission of thermal capture gamma radiation during the time period when inelastic gamma rays are being observed.

As is well known in the art, the scintillation crystal 12 produces a discrete flash of light whenever a gamma ray passes therethrough and exchanges energy with the crystal lattice structure. The photomultiplier tube 10 generates a voltage pulse proportional in height to the intensity of each such scintillation which occurs in the crystal 12. The intensity of such scintillations is functionally related to the energy of the gamma ray causing the light flash. Thus a voltage pulse generated by the tube 10 has an amplitude proportional to the energy of the corresponding gamma ray. These proportional voltage pulses produced by the tube 10 comprise a detector signal which is supplied to a linear amplifier 17 via a discriminator 18. Discriminator 18 may be used if desired to discriminate, for example, against low energy background gamma radiation. A preset bias level may be used to pass only pulses from the photomultiplier tube 10 exceeding the height corresponding to 1.78 MEV gamma rays generated in the inelastic scattering of neutrons by silicon. Low energy background gammas contributing to pulse pileup in both the logging cable and electronic equipment can be eliminated in this manner.

The neutron accelerator 11 is preferably operated by a pulsing circuit 14 which may be of conventional design as known in the art. The pulsing circuit 14 which functions to operate the accelerator 11 in short duration pulses may be controlled by timing pulses from a surface timing reference 39 communicated over the cable 8 conductors. This timing reference may also be located in the sonde 7 if desired. These timing signals are also supplied to a downhole reference pulser 20. For example, the pulsing circuit 14 could be activated by a timing pulse from the time reference 39 to emit a neutron burst of a specified time duration. The frequency of such bursts would then be controlled by the timing reference 39 frequency. In the inelastic scattering measurements contemplated in the present invention, it is desirable to use neutron pulses at least as short as about 5 microseconds in duration which are repeated at periodic intervals of approximately 5,000 to 20,000 or more times per second.

Referring now to FIG. 2 the relative time relationship of the neutron pulses just discussed to the operative portion of the gamma ray detector cycle and to the high energy and thermal neutron populations are shown. The accelerator cycle is represented by the solid curve 33. The inelastic gamma ray population in the vicinity of the detector crystal 12 is represented by the dashed curve 31. The thermal capture gamma ray population in the vicinity of the detector is shown by the dotted line curve 32. The operative detector cycle is represented by the separate solid line curve 34.

There is a rapid build up of the inelastic gamma ray population (curve 31) which is essentially present only during the neutron pulse. The thermal capture gamma ray population (curve 32) builds up much slower and reaches a peak only after the cessation of the five microsecond neutron pulse. In the diagram of FIG. 2 it will be noted that the neutron pulses are spaced sufficiently far apart in time for the thermal neutron population (curve 32) to decay to almost zero before the next pulse. However, in general and particularly at the higher pulse repetition rates some neutrons are still extant in the vicinity of the detector at the time the subsequent neutron pulse occurs. In this case the boron thermal neutron shielding material 15 and disc 16 is particularly adapted for reducing spurious gamma ray detections resulting from this source by rapidly absorbing such thermal neutrons.

Referring again to FIG. 1 and bearing in mind the timing sequence it will be observed that during the time the neutron accelerator 11 is activated, output signals from the photomultiplier tube 10 are conducted via the discriminator 18 linear amplifier 17 to a cable driver circuit 19 which may be of conventional design. A reference signal having a known amplitude is also supplied by pulser 20 to the input of the discriminator 18. This reference pulse provided by the downhole pulse 20 may be utilized in a gain control device or spectrum stabilizer 23 located at the surface to control the gain of the system in the manner described in the copending application Ser. No. 82,028 filed Oct. 19, 1970.

This, of course, may be accomplished primarily in the time interval between neutron pulses as the spectrum stabilizer 23 may be supplied with signals from the pulser continuously or in any desired sequence.

Since both the downhole pulse generator 14 and the surface gate 22 which controls the time selection of the data pulses from the downhole sonde are timed with the same timing reference 39 it is apparent that synchronism may be maintained between the surface equipment and downhole equipment. Thus the data signals may be gated in such a manner upon their arrival at the surface to select portions thereof for processing which are timed as desired relative to the emission of the neutrons in the manner as described with respect to FIG. 2.

Although not depicted in FIG. 1 it will be understood by those skilled in the art that electrical power may be supplied from a surface power source (not shown) via the well logging cable 8 to the downhole sonde 7. Suitable power supplies (not shown) are provided in the sonde 7 for powering the downhole portion of the equipment.

Output signals from the gate 22 comprise a sequence of count pulses resulting from gamma rays detected by the detector crystal 12 and photomultiplier tube 10 during the time interval that the neutron accelerator 11 is activated. These pulses comprise data mainly resulting from the exitation of nuclei in the vicinity of the detector crystal 12 which have been excited by the inelastic scattering of neutrons emitted by the accelerator 11. The inelastic gamma rays are supplied to a pulse height analyzer 24.

Pulse height analyzer 24 may be of conventional design as known in the art and may have, for example, four or more energy channels or divisions corresponding to quantitizations of the pulse height of the input pulses. The pulse height analyzer 24 functions to sort and accumulate a running total of the incoming pulses into a plurality of storage channels based on the height of the incoming pulses. These energy channels are directly related to the energy of the gamma rays causing the pulse. The output of the pulse height analyzer 24, in the case of the present invention, consists of a number of count pulses occurring in each of the four preselected energy ranges or windows depicted in FIG. 3.

Referring now to FIG. 3, the relative count rate as a function of energy is shown directly as curve 51. Curve 52 indicates the same relative count rate multiplied by a factor of 4 so that details may be more accurately seen. It will be observed that four energy windows corresponding to silicon (labeled Si), calcium (labeled Ca), carbon (labeled C), and oxygen (labeled O) are provided. In the practice of the method of the invention it has been found preferable to use a carbon energy window extending from 3.17 to 4.65 MEV. The oxygen energy window preferably extends from 4.86 to 6.34 MEV. The silicon window is chosen to extend from 1.65 to 1.86 MEV and the calcium window extends from 2.5 to 3.3 MEV. By using this choice of energy windows, the 4.44 MEV carbon inelastic scattering gamma ray peak and the 6.13 MEV oxygen inelastic gamma ray energy scattering peak are covered together with their corresponding single and double pair production escape peaks. The optimal choice of energy range for the silicon window encompasses the 1.78 MEV photo peak for silicon. The calcium energy window illustrated in FIG. 3 does not encompass the 3.73 MEV calcium photo peak due to carbon interference, but does encompass corresponding single and double escape peaks. It will be understood, of course, that slight variations in this placement of energy windows can be made if desired without compromising the inventive concepts of the invention.

The number of counts occurring in each of the four energy windows (C, O, Si and Ca) during the time interval (7 microseconds) that the downhole detector signals are supplied to the pulse height analyzer via the gate 22 are output from the pulse height analyzer 24 as four separate digital signals. These signals are supplied to a recorder 30 which is driven as a function of borehole depth either electrically or mechanically by the sheave wheel 9 as illustrated by the dotted line 44. These four separate digital signals may be thus plotted as a function of borehole depth as illustrated in FIG. 1. Moreover these four signals may be supplied to other data processing circuits 28 for determination of water saturation, porosity, or other data of interest, for example, using methods such as shown in the copending patent application Ser. No. 182,035 filed Sept. 20, 1971 which is assigned to the assignee of the present invention. In addition the output signals from the pulse height analyzer 24 which occur in the carbon and oxygen energy windows are supplied to a carbon/oxygen ratio computer 25. The C/O ratio output of the computer 25 drives one track of the recorder 30 as a function of borehole depth. Also the analyzer outputs which result from inelastic gamma rays in the silicon and calcium energy windows are supplied to a silicon/calcium ratio computer 26 which computes this ratio and drives yet another track of the recorder 30, then plotting the silicon/calcium ratio as a function of borehole depth. In the present invention at least six tracks are used on the recorder 30 to plot carbon, oxygen, silicon, calcium, carbon/oxygen ratio and silicon/ calcium ratio as a function of borehole depth.

Figure 4:
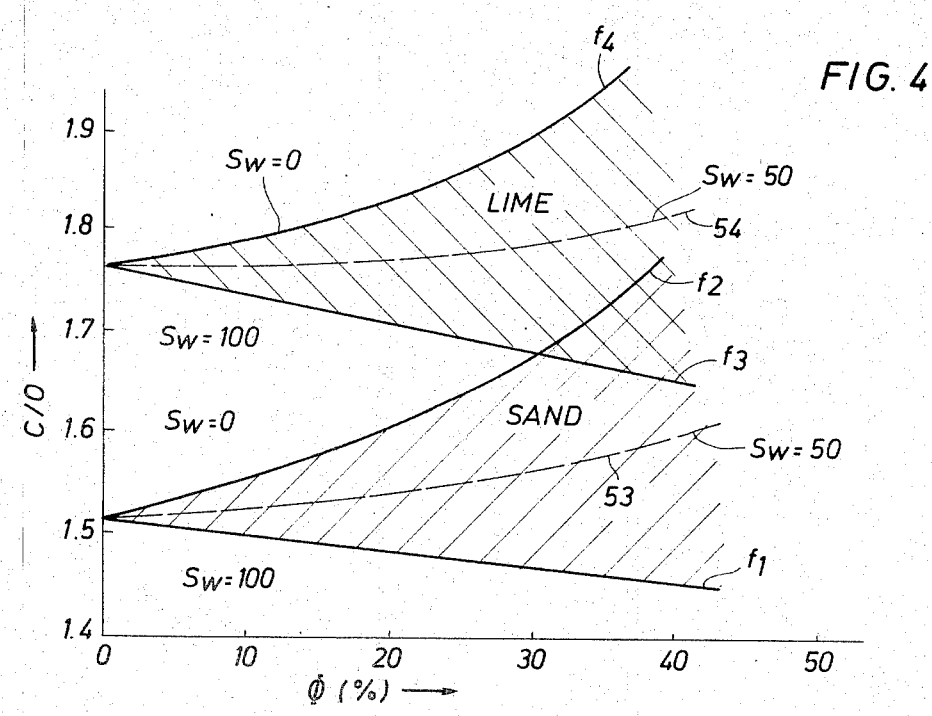
FIG. 4 is a graphical representation showing the carbon/oxygen ratio plotted as a function of formation porosity for several different lithologies and water saturation values as determined from test formation measurements.

Measurements made under test conditions using a well logging system such as that illustrated in FIG. 1 over a plurality of different types of test formations have been found to yield results illustrated graphically in FIG. 4. In FIG. 4 the curve labeled $f_1$ represents the relative ratio of counts in the carbon and oxygen count windows for a plurality of different sandstone formation porosoties at 100 percent water saturation. The curve labeled $f_2$ represents the carbon/oxygen counts ratio in sandstone formations at 0 percent water saturation. Similarly the curves $f_3$ and $f_4$ represent measurements obtained in limestone formations of varying porosities with 100 percent and 0 percent water saturation, respectively. The dotted line curves 53 and 54 of FIG. 4 represent the 50 percent water saturation carbon/oxygen ratio values for sandstone and limestone formations respectively. From the graphs of FIG. 4 it is apparent that an interpretation of the C/O ratio by itself would lead to ambiguities in determination of either matrix type or water saturation. For example, at porosoties greater than 30 percent, carbon/oxygen ratios in the range of 1.6 to 1.75 could be interpreted either as water saturated limestone as represented by curve $f_3$ or oil saturated sandstone as represented by curve $f_2$.

It will be recalled, as previously discussed, that anomalous results have resulted in the past in attempting to locate gas zones because the prior measurements have essentially depended on the presence of chlorine and the inability to distinguish gas from low porosity carbonate zones. In particular, low porosity water saturated limestone formations have been indistinguishable from higher porosity gas sands. This is due to the fact that both these types of formations have relatively low hydrogen content. In the present invention the counting rate in each of the individual carbon, oxygen, silicon, and calcium energy windows is measured and recorded. It will be recalled that hydrogen is a strong moderator of neutrons. Thus, when the high energy neutrons from the logging sonde 7 impinge upon a formation having a high hydrogen content, a lower counting rate results in the inelastic gamma ray energy spectrum. Measuring the counting rate individually in the carbon, oxygen, silicon, and calcium components of the gamma ray inelastic energy spectrum and looking for a region having a high counting rate (relatively low hydrogen index) present in all of these energy windows, establishes the first criterion for detection of a gas zone. This criterion does not eliminate the possibility of the zone being a low porosity interval, as is common in limestone, however.

If the well logging sonde is previously calibrated so that the carbon/oxygen and silicon/calcium ratios for a known water sand are determined, this can than act as a base line to determine from these ratios whether a given value of carbon/oxygen and silicon/calcium ratio is representative of a limestone or a sandstone. If the C/O value in the zone were higher than in the calibration water sand and the Si/Ca value were lower, then the zone would be interpreted as a limestone. However, if the C/O and Si/Ca values were about the same as in the calibration water sand then the limestone interpretation could be ruled out.

The procedure for locating gas zones, then, is to first determine zones which have high counting rates in the four individual windows (carbon, oxygen, silicon and calcium). This is characteristic of either gas bearing or low porosity zones. Using the computed carbon/oxygen ratio from the computer 25, and the silicon/calcium ratio from the computer 26 of FIG. 1, these ratios are compared with corresponding values taken in a known water sand. If the carbon/oxygen value in the zone of interest is higher than in the water sand, and if the silicon/calcium value is lower than in the water sand, the zone is interpreted as a limestone. However, if the carbon/oxygen ratio and silicon/calcium are both about the same as in the water sand, the zone is quite possibly a gas zone. This leaves a small ambiquity remaining between the low porosity water sands and a higher porosity gas sand because both would have a relatively low hydrogen content hence a higher counting rate and would have similar carbon to oxygen and silicon to calcium ratio values. Such analmous results could possibly be distinguished on the basis of independent porosity information made with another type of well logging tool such as a sonic logging tool. In practice this type of ambiquity would not occur so often as to be of major importance, the confusion between low porosity limestone and gas sands being the most prevalent shortcoming of prior gas logging systems.

Summarizing the techniques of the present invention include observing individual inelastic gamma ray counting rates in calcium, silicon, oxygen and carbon energy windows, together with the carbon/oxygen and silicon/calcium ratios, and from these observations a method has been developed for differentiating between low porosity limestones and gas sands. The disclosed method may make other alternative embodiments of the invention apparent to those skilled in the art. It is the aim of the appended claims to cover all such changes and modifications that fall within the true spirit and scope of the invention.

We claim:

1. A method for distinguishing natural hydrocarbon gas bearing zones from lower porosity water saturated limestone earth formations penetrated by a well borehole, comprising the steps of:
  determing the location in a well borehole of relatively low hydrogen content formations;
  determining the relative carbon/oxygen and silicon/calcium inelastic neutron scattering gamma ray counts ratios in said relatively low hydrogen content formations; and
  computing, based on said carbon/oxygen and silicon/calcium ratios the approximate proporation of limestone in said formation, thereby distinguishing gas zones from low porosity water saturated limestones.

2. The method of claim 1 wherein the step of computing the approximate proportion of limestone in said formations is performed by comparing the carbon/oxygen and silicon/calcium ratios for a formation being investigated with corresponding carbon/oxygen and silicon/calcium ratios for a known water saturated sand in the well and, if the carbon/oxygen ratio for the investigated formation is greater than in the known water sand and the silicon/calcium ratio for the investigated formation lower that in the known water sand, deriving a high value for the approximate proportion of limestone in said investigated formation.

3. The method of claim 1 wherein the step of determining the location of relatively low hydrogen content formation is performed by passing a well tool having a pulsed source of fast neutrons and a gamma ray detector through the borehole and measuring in preselected regions of the gamma ray energy spectrum, the number of gamma ray counts produced by inelastically scattered fast neutrons from the materials surrounding the well borehole.

4. The method of claim 3 wherein said preselected energy regions in the gamma ray energy spectrum are chosen to include energy regions for gamma rays produced by the nuclei of carbon, oxygen, silicon and calcium excited by the inelastic scattering of fast neutrons.

5. The method of claim 4 and further including the step of recording as a function of the borehole depth of said well tool, the counts occurring in each of said preselected energy regions of the gamma ray spectrum due to the inelastic neutron scattering excited nuclei of carbon, oxygen, silicon and calcium.

6. The method of claim 5 and further including the step of recording as a function of the borehole depth of said well tool the ratio of counts due to inelastic gamma rays occurring in the carbon/oxygen and silicon/calcium energy regions of the gamma ray energy spectrum.

7. The method of claim 1 wherein the step of computing the approximate proportion of limestone in said formation includes the step of determining beforehand the carbon/oxygen and silicon/calcium inelastic neutron scattering gamma ray counts ratios for a known water sand in the well to establish a calibration base and the step of comparing the carbon/oxygen and silicon/calcium inelastic neutron scattering gamma ray counts ratio of the earth formation being investigated to said calibration base to determine the approximate limestone content of said investigated formation.

8. A method for performing radiological well surveys to distinguish natural hydrocarbon gas bearing zones from lower porosity water saturated limestone zomes in a well, comprising the steps of:
  passing a well tool having a pulsed neutron source and a gamma ray detector through a well bore;
  repetitively iradiating the earth formation surrounding the well bore with relatively short duration pulses of fast neutrons;
  detecting, primarily during said neutron pulses, gamma radiation resulting from a plurality of preselected nuclei in formations surrounding said well bore being excited by inelastically scattered neutron;
  determining, based on said detected radiation, the location in the well of relatively low hydrogen content formations;
  determining from said detected radiation the relative ratios of inelastic gamma ray counts of at least two preselected sets of elements in said relatively low hydrogen content formations surrounding the borehole; and
  computing, based on said ratios, the approximate proportion of limestone in said formation, thereby distinguishing gas zones from low porosity water saturated limestones.

9. The method of claim 8 wherein said preselected nuclei whose excitation by inelastically scattered neutron is measured include carbon, oxygen, silicon and calcium nuclei.

10. The method of claim 9 wherein the step of determining the location of relatively low hydrogen content formations is performed by logging, as a function of depth of said well tool, the count rates of inelastic gamma rays from each of said carbon, oxygen, silicon and calcium energy regions of the gamma ray energy spectrum and determining the zones in which the count rates in each of these energy regions is relatively high.

11. The method of claim 9 wherein the step of computing, based on said ratios, the approximate proportion of limestone in said formation is performed by comparing the relative carbon/oxygen inelastic gamma ray counts ratio and the relative silicon/calcium counts ratio from a known water sand in the well to the same ratios from the formation under investigation, to thereby estimate the abundance of limestone relative to said known water sand.

12. The method of claim 11 wherein said carbon/oxygen and said silicon/calcium counts ratios are also logged as a function of the borehole depth of said logging tool.

* * * * *